United States Patent [19]

Ludman

[11] 4,056,323
[45] Nov. 1, 1977

[54] INTERFEROMETER OPTICAL SYSTEM

[76] Inventor: Jacques E. Ludman, 98 Old Lowell Road, Westford, Mass. 01886

[21] Appl. No.: 564,498

[22] Filed: Apr. 2, 1975

[51] Int. Cl.² .............................................. G01B 9/02
[52] U.S. Cl. ................................ 356/106 R; 356/110
[58] Field of Search ............................ 356/106 R, 110

[56]  References Cited
U.S. PATENT DOCUMENTS 3,597,091   8/1971   Bowker ........................... 350/106 R

OTHER PUBLICATIONS

Candler, *Modern Interferometers*, pp. 207–210, Hilger & Watts, Ltd., 1951.

Primary Examiner—John K. Corbin
Assistant Examiner—Matthew W. Koren

[57] ABSTRACT

An interferometer optical system for general use to measure optical parallelism or relative rotational or joint translational positions of the two spaced subject mirrors uses coherent light split into two beams which are directed, one normal to one of the two mirrors and the other normal to the other of the two mirrors. The reflections of these two beams are then superimposed on a target which reveals a light interference pattern indicative of the parallelism or relative rotation or joint translation of the two mirrors. In preferred embodiments, in order to compensate for the mutual tilt of the subject mirrors with respect to the plane of the beams incident thereon, the path of one of the beams to and from the subject mirror includes a corner mirror, or retrodirective mirror, and the path of the other beam includes at least one adjustable mirror.

8 Claims, 11 Drawing Figures

INTERFEROMETER OPTICAL SYSTEM

BACKGROUND OF THE INVENTION

This invention relates to interferometers, and particularly, to a method and means for measuring the parallelism or relative rotational or joint transational positions of two subject mirrors.

A laser optical cavity requires a high degree of parallelism between two opposing reflective interfaces or mirrors along the optical axis of the laser. The laser medium is frequently a rod of selected material transparent to the laser radiation and the ends of this rod are highly polished, optically flat, parallel surfaces. Hence, the ends of the rod function as mirrors and define the optical cavity of the laser. It is desirable in the field of laser technology to ascertain the degree of parallelism between the end faces of such a rod and to provide a method and means of quantitatively measuring the degree of parallelism or, expressed in another way, the direction and angle (if any) that one of the surfaces makes with the other.

Heretofore, an optical interferometer system has been employed to detect slight motions or linear displacements of a body along a track. In one of these systems, light from a laser is split, diverged and sent along two different paths to parallel oppositely facing mirrors on the body. The reflections of these beams from the mirrors on the body are superimposed and projected on a screen or they are projected on light detecting apparatus. When the body moves slightly along the track, light interference fringes move across the screen and can be viewed and detected with the apparatus. For example, these fringes which move across the screen are counted producing a count number which is a measure of the linear translation of the body along the track.

Such prior systems are referred to as interferometer systems because they employ interfering light beams that produce dark and light fringes on a screen on which the beams are projected and by observing the spacing, motion and displacement of these fringes, one can determine the motion and displacement of the body with reference to the track. In these systems, it is desirable that the two oppositely facing mirrors attached to the body be parallel, because deviation from parallelism decreases the reliability of the system. Hence, when using such systems, one presumes that these mirrors are parallel and relies upon that conclusion when interpreting the fringes projected on the screen to determine the motion and displacement of the body with reference to the track. If the mirrors are not parallel, a significant error in the measurements can occur. Clearly, when such apparatus is used as it is intended to be used, it does not reveal either the degree or the direction of non-parallelism of the two oppositely facing mirrors attached to the body.

SUMMARY OF THE INVENTION

Figures 7, 8, 10, 11:
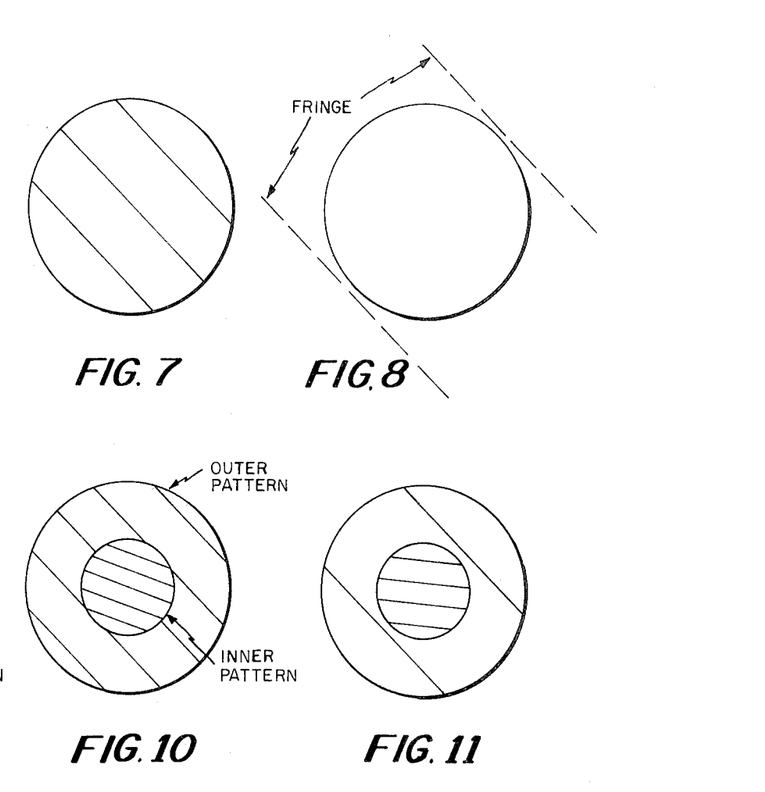
FIGS. 10 and 11 illustrate the inner and outer patterns when the inserted rod does in fact slightly upset the rest of the system and steps are progressively taken to correct the system without removing the rod to reveal, by virtue of the inner pattern, the degree of non-parallelism of the end faces of the rod and the direction of the non-parallelism.
Figure 9:
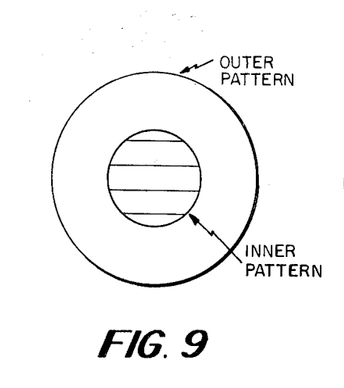
FIG. 9 illustrates the entire pattern when the system in FIG. 5 is adjusted as illustrated in FIGS. 6, 7 and 8, and a subject or reference rod is inserted in the closed optical path without upsetting the rest of the system.
Figure 12:
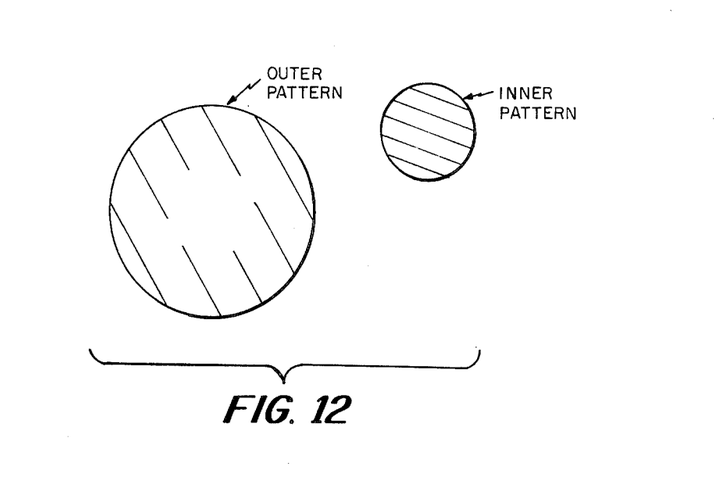
FIG. 12 illustrates the inner and outer patterns when the rod tilts, moving the inner pattern out of and away from the outer pattern without affecting the structure of either pattern.

In accordance with one embodiment of the present invention, an interferometer optical system is provided and used to measure the parallelism between two oppositely facing mirrors, such as the end faces of a laser rod. A beam of light from a laser is split into two beams and one beam is directed normal to one of the rod faces and the other beam is directed normal to the other face. The beams reflect from the end faces of the rod and are recombined by superimposing one upon the other and the superimposed beams are projected on a screen for viewing or they are projected on optical detection apparatus which detects light intensity. Since the light beams may be of substantially greater size, in cross-wise dimension than the end faces of the rod, some portions of the beams may not be impingent upon the end faces of the rod and yet may be superimposed and projected on the screen along with the portion of each beam which is impingent upon an end face of the rod and then superimposed and projected on the screen. Hence, the light projected on the screen may include two patterns: a smaller pattern of light from the portion of the two beams that reflect from the end faces of the rod and a larger pattern from the portion of the two beams that do not reflect from the end faces of the rod (see FIG. 12). The central region of the larger pattern will be featureless since the portion of the beam corresponding to that region is precisely that reflected by the end faces of the rod and superimposed to form the small pattern. The preferred alignment is such that the two patterns have a spacial separation of a few pattern diameters for ease of observation. However, the rod may be aligned so that the smaller pattern lies within the larger pattern as shown in FIGS. 9, 10 and 11. The larger or outer pattern reveals the alignment of the interferometer system, and consequently the various parts of the system can be adjusted while viewing this outer pattern to remove any interference fringes or lines which appear in the outer pattern and so assure that the system is perfectly aligned. Interference lines in the smaller or inner pattern reveal the angle and the direction of non-parallelism between the two end faces of the rod. Thus, a precise measure of the non-parallelism of the end faces of the rod is obtained.

Motion of the subject mirrors, as a unit, in a direction perpendicular to their surfaces results in a translation of the fringes in the smaller pattern. A count of the fringe motion is an accurate measure of the extent of motion of the mirrors. Motion in any direction not perpendicular to the mirror surfaces and/or tilting in any direction does not affect the pattern or the motion of the fringes. In the case of tilting, the entire (smaller or inner) pattern may move slightly on the screen, indicating that the mirrors are indeed tilting and not translating smoothly, but the motion of the fringes within the pattern is unaffected by the motion of the entire pattern. Such motion causes no degradation or inconvenience in the determination of either the degree of non-parallelism or extent of translation.

In one embodiment of the present invention, (FIGS. 1 and 2) where the optical paths of both the beams formed by splitting the laser beam all lie in a common place, slight tilting of the rod axis in that common plane does not degrade the reliability of the system for measuring the parallelism of the end faces of the rod. However, even slight tilting of the rod axis toward or away from that common plane will substantially reduce the reliability, because it introduces fringes in the inner pattern on the screen which cannot be distinguished from fringes cause by non-parallelism of the end faces of the rod. This is overcome by employing an additional mirror that together with adjacent perpendicular mirrors in the system form a retroreflective system or corner mirror. This corner reflector is in the path of both beams when no subject mirrors are present and in the path of one of the beams from the subject mirrors when they are introduced. A mirror in the path of the other beam from the subject mirrors is adjustable with respect to the system.

It is an object of the present invention to provide an interferometer optical system for measuring the parallelism between two reflective surfaces.

It is another object to measure the angle between two reflective surfaces which are nearly parallel to each other.

It is another object to measure the angle and the direction of the angle defined by two parallel surfaces which are nearly parallel to each other.

It is another object to provide an interferometer optical system for measuring the parallelism of the end faces of a rod such as used to provide the optical cavity and laser medium of an optical laser.

It is another object to provide an interferometer optical system for determining the degree of non-parallelism of two oppositely facing aligned mirrors which are nearly parallel to each other.

It is another object to provide a split beam interferometer optical system wherein the split beams follow the same closed path in opposite directions and are then superimposed and projected on a target and in which the closed path when interrupted by a pair of oppositely facing aligned mirrors causes fringes to appear in the projection which are indicative of the degree of non-parellelism of the two mirrors or relative rotation or joint transational positions of the two mirrors.

It is another object in conjunction with the above to provide such an interferometer optical system wherein the measurements are not degraded due to tilting of the mirrors in other directions with respect to the normal to the plane of the closed path.

DESCRIPTION OF EMBODIMENTS OF THE INVENTION

Figure 1:
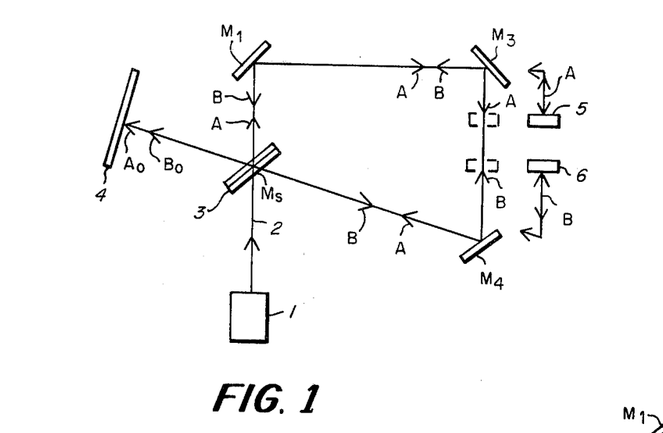
FIG. 1 is a schematic drawing of an interferometer optical system which directs two split beams from a laser, each over the same closed path and then superimposes the beams and projects them on a target such as a viewing screen, to illustrate the basic optical principles and structure of the present invention.

Referring first to FIG. 1, there is illustrated by diagram an interferometer optical system which is used for measuring the degree of parallelism of two spaced subject mirrors which may be the reflective faces at the ends of a rod which define a laser optical cavity. The system includes a monochromatic source of light that is conveniently provided by a laser 1. The laser beam 2 is a narrow parallel beam and is directed to a beam splitting mirror or pellicle $M_s$ which is oriented with respect to the center axis of the beam and includes a semi-reflecting surface 3 which splits the initial laser beam into two separate beams denoted A and B. The A beam is the transmitted beam, since it goes through the semi-reflecting surface 3 without change in direction. The B beam is the reflected beam, since it reflects from the semi-transparent surface and so emerges from the beam splitting mirror at an angle to beam A.

The A beam impinges on mirror $M_1$ which is oriented at 45° to this beam and so reflects from mirror $M_1$ to mirror $M_3$ upon which the beam is also incident at 45°. Thus, the mirrors $M_1$ and $M_3$ are perpendicular to each other and they are also perependicular to the common plane defined by the path of beam A from mirrors $M_s$ to $M_1$ and from mirrors $M_1$ to $M_3$. The A beam then reflects from mirror $M_3$ toward mirror $M_4$ which is disposed at an angle to the incident A beam, such that $M_4$ reflects the A beam back to the beam splitting mirror $M_s$ to the same spot on the semi-reflective surface 3 in that mirror which was the origin of beam A. The beam splitting mirror then splits the returned beam A, transmitting a portion of this beam without change of direction toward the target 4. The other portion of the returned beam A which is split by $M_s$, is directed back toward the laser and is of no use in the system.

Beam B which begins at an angle to beam A is directed from $M_s$ to $M_4$, from $M_4$ to $M_3$, from $M_3$ to $M_1$ and from $M_1$ back to $M_s$. The returned beam B is split at $M_s$ and a portion is reflected by the semi-reflective surface 3 toward the target 4. The other portion of the returned beam B is transmitted through $M_s$ toward the laser and is of no use in the system.

Thus, the initial laser beam is split into two equal beams, the A beam and the B beam, the A beam is reflected around the optical system of mirrors in the clockwise direction, as viewed in FIG. 1 and the B beam is reflected around the system in the counterclockwise direction. Also, the portions of beams A and B that are directed from $M_s$ toward the target are superimposed on each other and are denoted herein $A_0$ and $B_0$, respectively. Furthermore, where the four mirrors $M_s$, $M_1$, $M_3$ and $M_4$ are all perpendicular to the page, as shown in FIG. 1 and the initial laser beam is parallel to the page and also parallel to the optical line from $M_s$ to $M_1$, then both beams will propogate over precisely the same paths between the mirrors, but in opposite directions and the output beams $A_0$ and $B_0$ will be perfectly superimposed one upon the other and the total image of these superimposed beams at the target will have no interference lines or fringes.

Now, if two optically flat subject mirrors 5 and 6 which are perfectly parallel are inserted into the leg of the optical path between mirrors $M_3$ and $M_4$ (adjusted such that the optical path between mirror 5 and $M_s$ is similar in length to the optical path between mirror 6 and $M_s$) so that mirror 5 reflects the A beam and mirror 6 reflects the B beam, as shown by the broken line positions of these mirrors in FIG. 1, then the A and B beams will both be directed back to the same spot on the semi-reflective surface 3 from whence they started and a portion of the A beam will be reflected by surface 3 toward the target and a portion of the B bema will be transmitted through surface 3 to the target. These two output portions of the reflected A and B beams, now denoted $A_0'$ and $B_0'$, respectively, will be perfectly superimposed one upon the other and will produce no interference lines or fringes on the target. Hence, the lack of any interference lines or fringes in the image of these superimposed beams $A_0'$ and $B_0'$ on the target indicate that the two mirrors 5 and 6 are perfectly parallel. If these mirrors 5 and 6 are the reflective ends of a rod such as used as a laser optical cavity, then the lack of lines or fringes in the image at the target indicates that the reflective ends of the rod are perfectly parallel to each other.

Figure 2:
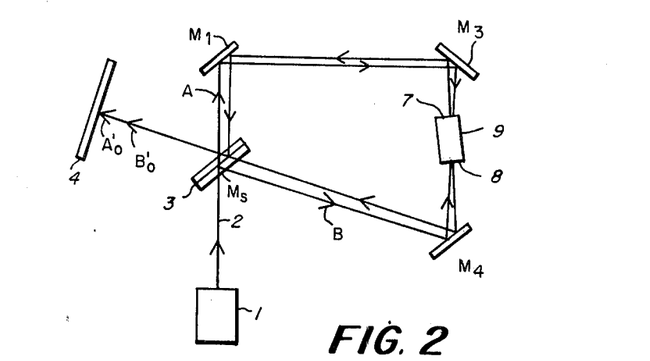
FIG. 2 is an optical schematic of the same system shown in FIG. 1 and in which a rod carrying two spaced subject mirrors (reflective ends of the rod) is inserted in the closed optical path, to illustrate use of the system to measure the degree of parallelism between the two ends of the rod.

FIG. 2 shows the same system as shown in FIG. 1 and in which the two mirrors are the reflective ends 7 and 8 of a subject rod 9 which is inserted into the optical path between the mirrors $M_3$ and $M_4$. If the rod is inserted so that the reflective ends 7 and 8 are mutually tilted slightly (the rod axis is tilted) so that they are not perpendicular to the optical paths between mirrors $M_3$ and $M_4$ and if the tilt angle lies in the plane of the paper, then the reflected beams A and B will not impinge on the same spot of the semi-reflective surface 3, as the original source beam. However, the output beams $A_0'$ and $B_0'$ will still be parallel to and coincident with each other and all paths of both beams will lie in the plane of the paper. As a result, there will still be no interference fringes in the image of the output beams projected in the target. This situation will hold so long as the two reflective ends 7 and 8 of the rod 9 are absolutely parallel to each other. On the other hand, even if the rod end faces are absolutely parallel, if the rod axis is tilted with respect to the plane of the paper, fringes will occur. Thus, the system shown in FIGS. 1 and 2 is useful to detect non-parallelism between the end faces of the rod, only so long as all beam paths lie in the common plane and there is no tilt of the axis of the rods with respect to that common plane. Clearly, this is a serious limitation of such a system.

Figure 3:
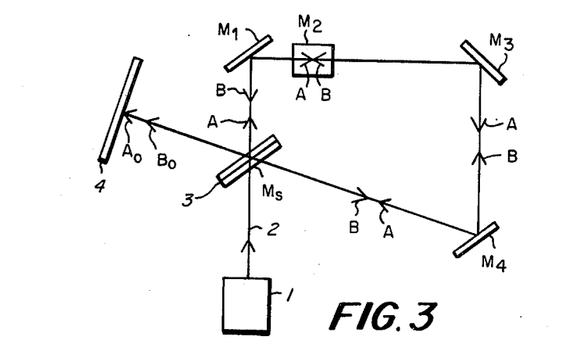
FIG. 3 is a schematic drawing of an improved embodiment of the invention wherein the closed optical path includes a corner reflector also called a retrodirective mirror.
Figure 4:
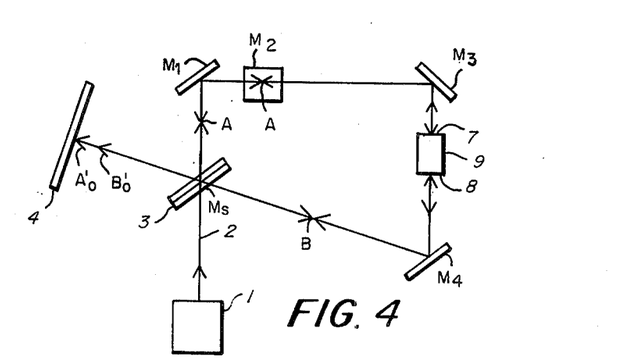
FIG. 4 is a schematic of the same system shown in FIG. 3 and in which a subject rod having reflective end faces is inserted in the closed optical path and the system is used to determine the degree of non-parallelism between the end faces of the rod, even when the axis of the rod is tilted slightly in any direction with reference to the direction of the closed path where the rod is inserted.

FIGS. 3 and 4 show a system for measuring the degree of non-parallelism between the reflective end faces of the subject rod wherein the above limitation is substantially avoided. Hence, the system shown in FIGS. 3 and 4 includes an improvement over the system shown in FIGS. 1 and 2. In both these systems shown, the parts which may be identical bear the same reference designation. In FIG. 3, the improved system is shown without the subject rod inserted. The improved system includes a mirror $M_2$ located in the path between mirrors $M_1$ and $M_3$. The mirrors $M_1$ and $M_3$ are inclined so as to include reflection from $M_2$ in the optical path. The three mirrors $M_1$, $M_2$ and $M_3$ are mutually perpendicular and combine to define a corner reflector, also called a retrodirective mirror or cube reflector. This system can be aligned to obtain parallel beam paths of similar lengths such that no interference fringes or lines appear on the target. The alignment is accomplished by first adjusting $M_4$ so that the A beam intersects itself at the $M_s$ surface after one circuit of the system and then adjusting $M_s$ so that no fringes appear on the screen. This makes the B beam path between $M_s$ and $M_4$ coincident with the A beam path between these mirrors and, as a result, insures parallelism of the A and B beams throughout the system.

After aligning the system shown in FIG. 3, the subject or reference rod 9 is introduced in the optical path between $M_3$ and $M_4$. If the reflective faces 7 and 8 are exactly parallel, then the superimposed output beams $A_0'$ and $B_0'$ projected on the target 4 will not produce any interference fringes or lines. On the other hand, if interference fringes do appear on the target in the inner pattern projected on the target (as shown in FIG. 9) it will mean that the faces 7 and 8 deviate from parallelism. Expressed in another way, the appearance of fringe lines will mean that the two emerging output beams $A_0'$ and $B_0'$ will not be exactly parallel, but will diverge.

If the target 4 is a screen, then the pattern projected on the screen by the output beams $A_0'$ and $B_0'$ will be a circle which is referred to herein as the central pattern. Radiation from beams A and B which does not reflect from the end faces 7 and 8, but in fact passes the sample 9 and returns to the point of origin of these beams in the semi-reflective layer 3 of $M_s$, just as though sample rod 9 where not in the circuit, will also be projected on the screen and is referred to herein as output beams $A_0$ and $B_0$. The outputs $A_0$ and $B_0$ define a larger pattern than the outputs $A_0'$ and $B_0'$. This larger pattern is referred to herein as the outer pattern and is free of interference lines when the system, not including rod 9, as in exact alignment so that the output beams $A_0$ and $B_0$ are exactly superimposed and parallel to each other. Both the inner and the outer patterns are shown in FIGS. 9 to 11 and illustrate different steps of adjustment of the system.

The complete pattern, shown in FIG. 9 indicates that the system, excluding the rod 9, is in perfedct adjustment, and that the reflective end faces 7 and 8 of the rod 9 are not exactly parallel. For example, where the diameter of the end faces is D and the central pattern as shown in FIG. 9 contains four fringe lins, then the angular deviation from parallelism of the two end faces of the rod, denoted $\theta$, is given as follows:

$$\theta = 2\lambda/D$$

where $\lambda$ is the wavelength of the laser beam. This same relationship holds true for the system shown in FIG. 2 that does not include a retrodirective mirror and so does not include $M_2$. However, with the system shown in FIG. 2, the pattern shown in FIG. 9 could occur for any of the following reasons: the rod faces deviate from parallelism; the axis of the rod is not parallel to the beam path between mirrors $M_3$ and $M_4$; a combination of the first two reasons. It can be seen from the relationship above that with the system shown in FIG. 2, misalignments of the rod axis on the order of one minute could obscure the measure of parallelism. In other words, if the axis of the rod were tilted with reference to the plane defined by the beam paths (the plane of the paper) by an angle of one minute, fringes would appear in the central pattern on the screen due to the tilt. Thus, it would be impossible to tell whether the fringes were caused by the tilt or by non-parallelism between the two reflective end faces of the rod 9.

In many uses of the interferometer systems described herein for measuring the degree of parallelism between two optically flat mirrors, it is impractical to require that the axis of the two mirrors be placed precisely in the system, because there is no simple method of accurately determining the alignment of that axis with the beam path. More particularly, where the two subject mirrors are the reflecting end faces of a laser rod, it is impractical to require that the rod be precisely placed in the interferometer optical system, because there is no simple method of accurately determining the rod axis or the alignment of that axis with the beam path between the mirrors $M_3$ and $M_4$. Hence, it is of considerable advantage to use the improved system described herein with reference to FIGS. 3 and 4, in which fringes appearing in the central or smaller pattern are attributable only to non-parallelism of the two end faces of the rod. In this improved system, the rod axis can be tilted slightly in any direction relative to the beam path between the mirrors $M_3$ and $M_4$ without significantly changing the parallelism of the output beams $A_0'$ and $B_0'$.

Figure 5:
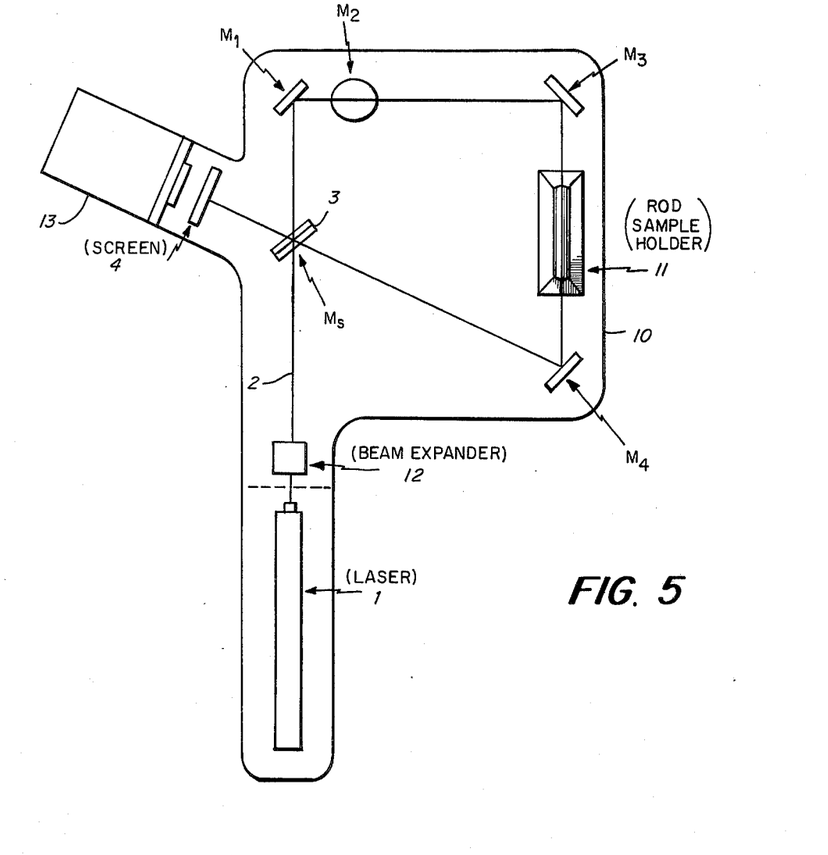
FIG. 5 is a plan view of the system shown schematically in FIG. 4.
Figure 6:
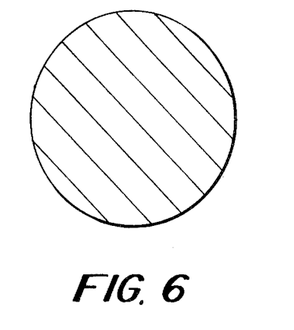
FIGS. 6, 7 and 8 illustrate the projected pattern and show a typical orientation of interference fringe lines as the system is progesssively adjusted without the subject rod inserted to intercept the beams in the closed optical path.

FIG. 5 illustrates the same system shown in FIG. 4 laid out on a platform 10. Parts in the system shown in FIG. 5 which are equivalent to the system in FIG. 4 bear the same reference designation. Here, the system is illustrated without the subject rod inserted in the optical circuit. All parts of this system are mounted on an optical platform 10 and a holder 11 is provided for holding the test rod. In addition, a beam expander 12 is provided between laser 1 and the beam splitting mirror $M_s$. Also, a camera 13 may be mounted on the platform for recording the projected patterns on the film. FIGS. 6 to 12 illustrates the patterns that are projected on the screeen and are referred to herein as an aid to understanding the use and operation of the system to measure the degree of parallelism, or lack of parallelism, between the reflective end faces of the subject rod.

In operation, this system is used in the following manner:

1. First the laser is turned on and the beam expander 12 is removed from the path of the laser beam 2.

2. Then the laser beam direction is adjusted so that the laser beam 2 strikes $M_s$ near its center.

3. Then $M_s$ and $M_4$ are adjusted in position by positioning screws (not shown) so that the system beams, A and B, return to $M_s$ at the point of incidence of beam 2 and the two laser spots from output beams $A_0$ and $B_0$ coalesce on the screen.

4. Then the beam expander 12 is inserted in the system and $M_4$ is adjusted until the pattern on the screen is free of fringes. At first, this large pattern will show many fringe lines. These disappear as $M_4$ is adjusted. As $M_4$ is adjusted, the fringes separate and/or rotate in the pattern and separate until they are spaced so far apart from each other than none fall within the diameter of the large pattern.

5. Then the subject rod (not shown) is inserted in the holder 11 and visually aligned in the system between $M_3$ and $M_4$. At this point, the pattern on the screen should be as illustrated in FIG. 9 (though the patterns may be separated as in FIG. 12), provided, however, that the system has not been put out of alignment when the rod is inserted.

As already described, each fringe line in the central pattern corresponds to a deviation from parallelism of the rod of one-half wavelength of the laser radiation. Hence, the four fringe lines shown in the central pattern in FIG. 9 correspond to an angular deviation $\theta$ from parallelism of 2 $\lambda/D$ radians. For example, where the rod diameter is one centimeter and $\lambda = 6328$ Angstroms, then the angular deviation from parallelism is $1.3 \times 10^{-4}$ radians or approximately 0.43 minutes of angle.

If upon inserting the rod in the system, shown in FIG. 5, the outer pattern now shows fringe lines, it means that the system excluding the rod has been put out of alignment. This is illustrated by the inner and outer patterns shown in FIG. 10. If this occurs, then $M_4$ is again adjusted (step 4) so that the outer pattern fringes expand. After adjustment of $M_4$, count the number of fringe lines appearing in the inner pattern and calculate the angular deviation from parallelism of the rod.

To determine the sense of the deviation from parallelism, the following analysis is made: (a) If the fringes are nearly horizontal, then to determine whether the top of the laser rod is longer than the bottom or vice versa, $M_4$ may be tilted slightly upward and if the fringes expand, the top of the rod is longer and if the fringes contract, the top is shorter. (b) If the fringes are nearly vertical, then to determine whether the outside of the rod is longer than the inside or vice versa, $M_4$ may be rotated clockwise and if the fringes expand, the outside of the rod is longer than the inside and if the fringes contract, the inside is longer than the outside.

The improved system, shown in FIGS. 3 to 5 includes the mirror $M_2$ so that $M_1$ and $M_2$ and $M_3$ combine to form a corner reflector or retrodirective mirror. This eliminates errors in the system due to tilt of the sample as described. A rigorous analysis of the system can be made to show that this is accomplished. The following analysis shows that the addition of $M_2$ in the system as described will, in fact, eliminate errors due to the tilt of the rod with reference to the plane of the system, and consequently the system will be insensitive to any tilt of the rod.

A sample rod inserted into a suitably aligned system at an angle $\beta$ to the beam path between $M_3$ and $M_4$ results in two beams $A_0'$ and $B_0'$ at an angle $\alpha$, ($\alpha = 2\beta$), to the uninterrupted beams $A_0$ and $B_0$ (system aligned as in FIG. 4, with rod 9 slightly misaligned). The resulting pattern from $A_0'$ and $B_0'$ is due to the non-parallelism of the rod end faces and also partially due to the misalignment of the rod in the apparatus. To determine the portion of the pattern due to the misalignment and demonstrate that it is negligible, it should be noted that an exit beam at an angle $\alpha$ to the uninterrupted beams $A_0$ and $B_0$ may be affected without inserting a rod by simply turning the laser source beam an angle $\alpha$. The change in pattern due to turning the laser beam by an angle $\alpha$ will lead to a fringe pattern just equal to that a parallel-faced rod misaligned by an angle $\beta$.

Figure 13:
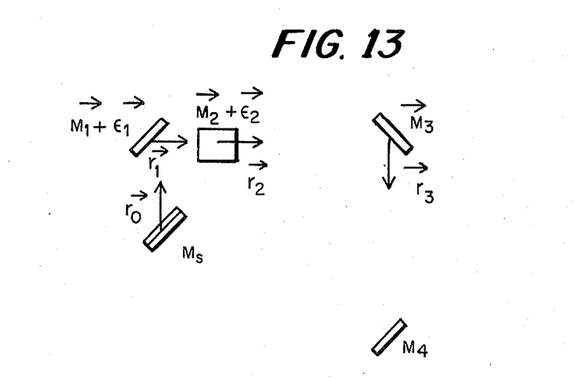
FIG. 13 is a schematic drawing of the improved embodiment showing vectors as an aid to understanding operation of the system.

Using vector algebra with $\vec{M}$ being unit vectors of mirror normals and $\vec{r}$ being unit vector path directions as shown in FIG. 13, and with mirrors $M_1$, $M_2$, $M_3$ aligned as a corner cube then $$\vec{M}_1 \cdot \vec{M}_2 = \vec{M}_1 \cdot \vec{M}_3 = \vec{M}_2 \cdot \vec{M}_3 = 0.$$

This can easily be done to within a few minutes of arc so that the mirrors are actually aligned as $\vec{M}_1 + \vec{\epsilon}_1$, $\vec{M}_2 + \vec{\epsilon}_2$, $\vec{M}_3$ (reference mirror) where $|\epsilon|/|M| < 0.01$.

Consider the beam $\vec{r}_0$, $\vec{r}_1$, $\vec{r}_2$, $\vec{r}_3$ depicted in FIG. 13 and apply the mirror equation $\vec{r}_{new} = \vec{r}_{old} - 2[\vec{M} \cdot \vec{r}_{old}]\vec{M}$. So $$\vec{r}_1 = \vec{r}_0 - 2[(\vec{M}_1 + \vec{\epsilon}_1) \cdot \vec{r}_0](\vec{M}_1 + \vec{\epsilon}_1)$$

or $$\vec{r}_1 = \vec{r}_0 - 2[(\vec{M}_1 \cdot \vec{r}_0 + \vec{\epsilon}_1 \cdot \vec{r}_0)](\vec{M}_1 + \vec{\epsilon}_1) \quad (1)$$

and $$\vec{r}_2 = \vec{r}_1 - 2[(\vec{M}_2 + \vec{\epsilon}_2) \cdot \vec{r}_1](\vec{M}_2 + \vec{\epsilon}_2)$$

and substituting Eq. (1)

$$\vec{r}_2 = \vec{r}_0 - 2(\vec{M}_1 \cdot \vec{r}_0 + \vec{\epsilon}_1 \cdot \vec{r}_0)(\vec{M}_1 + \vec{\epsilon}_1) - 2\{(\vec{M}_2 + \vec{\epsilon}_2) \cdot [\vec{r}_0 - 2(\vec{M}_1 \cdot \vec{r}_0 + \vec{\epsilon}_1 \cdot \vec{r}_0)(\vec{M}_1 + \vec{\epsilon}_1)]\}(\vec{M}_2 + \vec{\epsilon}_2).$$

Therefore, $$\vec{r}_2 = \vec{r}_0 - 2\,(\vec{M}_1 \cdot \vec{r}_0)\vec{M}_1 - 2(\vec{\epsilon}_1 \cdot \vec{r}_0)\vec{M}_1 - 2(\vec{M}_1 \cdot \vec{r}_0)\vec{\epsilon}_1 \\
- 2\{\vec{M}_2 \cdot [\vec{r}_0 - 2(\vec{M}_1 \cdot \vec{r}_0)\vec{M}_1 - 2(\vec{\epsilon}_1 \cdot \vec{r}_0)\vec{M}_1 - 2(\vec{M}_1 \cdot \vec{r}_0)\vec{\epsilon}_1]\}\vec{M}_2 - 2\{\vec{\epsilon}_2 \cdot [\vec{r}_0 - 2(\vec{M}_1 \cdot \vec{r}_0)\vec{M}_1 - 2(\vec{\epsilon}_1 \cdot \vec{r}_0)\vec{M}_1 - 2(\vec{M}_1 \cdot \vec{r}_0)\vec{\epsilon}_1]\}\vec{M}_2 - 2\{\vec{M}_2 \cdot [\vec{r}_0 - 2(\vec{M}_1 \cdot \vec{r}_0)\vec{M}_1 - 2(\vec{\epsilon}_1 \cdot \vec{r}_0)\vec{M}_1 - 2(\vec{M}_1 \cdot \vec{r}_0)\vec{\epsilon}_1]\}\vec{\epsilon}_2 \quad (2)$$

wherein terms of second order in $\epsilon$, such as $[-2(\vec{\epsilon}_1 \cdot \vec{r}_0)\vec{\epsilon}_1]$, have been neglected.

Eq. (2) becomes $$\vec{r}_2 = \vec{r}_0 - 2(\vec{M}_1 \cdot \vec{r}_0)\vec{M}_1 - 2(\vec{\epsilon}_1 \cdot \vec{r}_0)\vec{M}_1 - 2(\vec{M}_1 \cdot \vec{r}_0)\vec{\epsilon}_1 - \\
2(\vec{M}_2 \cdot \vec{r}_0)\vec{M}_2 + 4(\vec{M}_1 \cdot \vec{r}_0)(\vec{M}_2 \cdot \vec{\epsilon}_1)\vec{M}_2 - 2(\vec{\epsilon}_2 \cdot \vec{r}_0)\vec{M}_2 \\
+ 4(\vec{M}_1 \cdot \vec{r}_0)(\vec{M}_1 \cdot \vec{\epsilon}_2)\vec{M}_2 - 2(\vec{M}_2 \cdot \vec{r}_0)\vec{\epsilon}_2 \quad (3)$$

to first order. Note that $4(\vec{M}_2 \cdot \vec{M}_1)(\vec{M}_1 \cdot \vec{r}_0)\vec{\epsilon}_2 = 0$ since $(\vec{M}_2 \cdot \vec{M}_1) = 0$. Similar terms do not appear in Eq. (3). Further, $\vec{r}_3 = \vec{r}_2 - 2(\vec{M}_3 \cdot \vec{r}_2)\vec{M}_3$; and using Eq. (3) to substitute for $\vec{r}_2$ in the expression $-2(\vec{M}_3 \cdot \vec{r}_2)\vec{M}_3$ leads to $$\vec{r}_3 = \vec{r}_2 - 2\{\vec{M}_3 \cdot [\vec{r}_0 - 2(\vec{M}_1 \cdot \vec{r}_0)\vec{\epsilon}_1 - 2(\vec{M}_2 \cdot \vec{r}_0)\vec{\epsilon}_2]\}\vec{M}_3$$

to first order. Therefore $$\vec{r}_3 = \vec{r}_0 - 2\vec{r}_0 - 2(\vec{\epsilon}_1 \cdot \vec{r}_0)\vec{M}_1 - 2(\vec{M}_1 \cdot \vec{r}_0)\vec{\epsilon}_1 + 4(\vec{M}_1 \cdot \vec{r}_0)(\vec{M}_2 \cdot \vec{\epsilon}_1)\vec{M}_2 - 2(\vec{\epsilon}_2 \cdot \vec{r}_0)\vec{M}_2 + 4(\vec{M}_1 \cdot \vec{r}_0)(\vec{M}_1 \cdot \vec{\epsilon}_2)\vec{M}_2 - 2(\vec{M}_2 \cdot \vec{r}_0)\vec{\epsilon}_2 + 4(\vec{M}_1 \cdot \vec{r}_0)(\vec{M}_3 \cdot \vec{\epsilon}_1)\vec{M}_3 + 4(\vec{M}_2 \cdot \vec{r}_0)(\vec{M}_3 \cdot \vec{\epsilon}_2)\vec{M}_3 \quad (3a)$$

since $$-2\vec{r}_0 = -2(\vec{M}_1 \cdot \vec{r}_0)\vec{M}_1 - 2(\vec{M}_2 \cdot \vec{r}_0)\vec{M}_2 - 2(\vec{M}_3 \cdot \vec{r}_0)\vec{M}_3$$

and finally, $$\vec{r}_3 = -\vec{r}_0 + f(\vec{\epsilon}_1, \vec{\epsilon}_2) \quad (4)$$

where $f(\vec{\epsilon}_1, \vec{\epsilon}_2)$ is the sum of several (namely, 8) terms of the form $A(|\vec{\epsilon}||\vec{r}_0|)\vec{v}$ in which $\vec{v}$ is a unit vector and A is the appropriate term coefficient multiplied by the cosines indicated by the dot products; i.e., the 5th term in Eq. (3a) is $4(\vec{M}_1 \cdot \vec{r}_0)(\vec{M}_2 \cdot \vec{\epsilon}_1)\vec{M}_2$ in which case $\vec{v}$ is $\vec{M}_2$ and $A = 4 \cos \theta \cos \Phi$ wherein $\theta$ is the angle between $\vec{M}_1$ and $\vec{r}_0$, and $\Phi$ is the angle between $\vec{M}_2$ and $\vec{\epsilon}_1$. Thus, the 5th term in Eq. (3a) is $4 \cos \theta \cos \Phi (|\epsilon_1||r_0|)\vec{M}_2$. These terms are all of the order $\epsilon$ and the sum of all these terms is $A_t(|\epsilon_t||r_0|)\vec{v}_t$ where the subscript, $t$, indicates the results of vector addition. We now have $\vec{r}_3 = -\vec{r}_0 + A_t(\vec{\epsilon}_t \cdot \vec{r}_0)\vec{v}_t$ from Eq. (4).

Now denoting the entire clockwise travelling beam ( A ), it is clear that $M_s$ and $M_4$ may be adjusted such that the counterclockwise travelling beam ( B ) may be adjusted to be parallel and opposite (antiparallel) to ( A ). In this case, ( B ) in the $M_3$-$M_4$ leg must have the form $R = +r_0 - A_B(\epsilon_B \cdot r_0)v_t$ to be antiparallel and in addition $$A_t(\vec{\epsilon}_t \cdot \vec{r}_0)\vec{v}_t = A_B(\vec{\epsilon}_B \cdot \vec{r}_0)\vec{v}_t \quad (5)$$

for this particular $\vec{r}_0$.

Now introduce a deviation in $\vec{r}_0$ of an amount such that $\vec{r}_0 = \vec{r}_0 + \vec{Z}$. Then the clockwise beam $(\vec{A})$ in leg $M_3 - M_4$ is $\vec{r}_3 = -(\vec{r}_0 + \vec{Z}) + A_t[\vec{\epsilon}_t \cdot (\vec{r}_0 + \vec{Z})]\vec{v}_t$, or $\vec{r}_3 = -(\vec{r}_0 + \vec{Z}) + A_t(\vec{\epsilon}_t \cdot \vec{r}_0)\vec{v}_t + A_t(\vec{\epsilon}_t \cdot \vec{Z})\vec{v}_t \quad (6)$ and the counterclockwise beam $(\vec{B})$ in leg $M_3$-$M_4$ is $$\vec{R} = \vec{r}_0 + \vec{Z} - A_B[\vec{\epsilon}_B \cdot (\vec{r}_0 + \vec{Z})]\vec{v}_t$$

or $$\vec{R} = \vec{r}_0 + \vec{Z} - A_B(\vec{\epsilon}_B \cdot \vec{r}_0)\vec{v}_t - A_B(\vec{\epsilon}_B \cdot \vec{Z})\vec{v}_t \quad (7)$$

The deviation in parallelism due to the change in $\vec{r}_0$ by $\vec{Z}$ is just the difference between Eqs. (6) and (7):

$$\text{Dev} = \vec{r}_3 + \vec{R} = A_t(\vec{\epsilon}_t \cdot \vec{r}_0)\vec{v}_t + A_t(\vec{\epsilon}_t \cdot \vec{Z})\vec{v}_t - A_B(\vec{\epsilon}_B \cdot \vec{r}_0)\vec{v}_t - A_B(\vec{\epsilon}_B \cdot \vec{Z})\vec{v}_t \quad (8)$$

From Eq. (5), the first and third terms in Eq. (8) vanish and Eq. (8) can be written $$\text{Dev} = [A_t(\vec{\epsilon}_t \cdot \vec{Z}) - A_B(\vec{\epsilon}_B \cdot \vec{Z})]\vec{v}_t \quad (9)$$

and, therefore, the deviation is of the order $(|\epsilon||Z|)$.

This means that a beam misalignment of 5° or 0.1 rad, for example, (corresponding to a rod misalignment of 2.5° or 0.05 rad) with mirror misalignments of one minute or 0.0003 rad introduces a total error of the order of $Z\epsilon = (0.1)(0.0003)$ rad or approximately ten seconds of spurious deviation from parallelism. For a 1 cm. diameter rod, one fringe is $$\lambda/2\,D = (0.63 \times 10^{-4})/(2) = 0.32 \times 10^{-4}$$

approximating ten seconds of arc, and, consequently, a rod misalignment as large as 2.5° results in approximately 1 fringe in a 1 cm. field of view.

This preferred apparatus, therefore, will accommodate rod misalignments up to 2.5° without introducing an error in the measurement of parallelism greater than a few seconds of arc.

Both of the systems described herein, that is the system shown in FIGS. 1 and 2 and the improved system shown and described with references to FIGS. 3 to 13, are used to determine the degree of parallelism or non-parallelism of two subject mirrors. Furthermore, these systems are particularly useful for determining the degree of parallelism between the reflective end faces of a laser rod. Other and similar uses include the following: The systems can be used in conjunction with with Fabry-Perot fringes of a rod itself. For example, a rod with poor homogeneity and good parallelism of end faces will show Fabry-Perot fringes and is not a good rod and should be discarded. However, a rod with good homogeneity and poor parallelism will also show Fabry-Perot fringes but simply needs polishing. The rods may be measured jointly by use of a Fabry-Perot apparatus and also by use of the interferometers described in the present invention. Rods may also be continuously monitored with a joint apparatus to determine both the rod refractive index variation and distortion of the rod end faces. Also, infra-red laser rods may be measured with either of the systems of the present invention using visible laser light to determine their optical characteristics to a higher precision than if the characteristics were measured with infra-red radiation.

The optical systems of the present invention can also be used to measure the degree of parallelism of the ends of non-transparent optical devices such as gage blocks. Very slight rotations of one body with reference to another body can be determined by mounting one of the two subject mirrors on one body and mounting the other mirror on the other body so that the two mirrors are spaced apart, facing in opposite directions and are substantially parallel. It is then only necessary to note the change in the number of fringes in the inner pattern to determine slight changes in the angular position of one body with respect to the other.

The optical systems of the present invention may also be used to measure motion in a direction perpendicular to the end faces. Fringes traverse the inner pattern when the rod is moved in this direction. Motion or rotation in any other independent direction has no affect on the motion of the fringes in the pattern.

In the preferred embodiment of the present invention shown in FIGS. 3 to 13, the three mirrors $M_1$, $M_2$ and $M_3$ which are mutually perpendicular and define a cube reflector can be provided in a number of different ways. For example, they can be provided as three separate mirrors just as described herein, or they can be provided by a solid glass corner cube called a retroreflector prism in which three internal faces are made totally reflective. This variation and other variations of the system described herein can be made by one skilled in the art without deviating from the spirit and scope of the invention as set forth in the appended claims.

What is claimed is:

1. An interferometer optical system for measuring the positions of first and second space subject mirrors comprising,
    a source of coherent radiation directed along an initial path,
    a target for the radiation,
    means in said path for splitting said radiation into two substantially equal beams, a first beam and a second beam,
    first optical means including first, second and third mutually perpendicular mirrors for directing the first beam normal to the first spaced mirror,
    second optical means for directing the second beam normal to the second spaced mirror,
    the first optical means serving to direct the first beam which reflects from the first spaced mirror back to the beam splitting means,
    the second optical means serving to direct the second beam which reflects from the second spaced mirror back to the beam splitting means, and
    at said beam splitting means, at least a portion of said reflected first and second beams are superimposed and directed to said target,
    whereby light patterns appearing on the target are indicative of the positions of the first and second subject mirrors.

2. An interferometer optical system as in claim 1 wherein,
    the spaced subject mirrors are fixed with respect to each other and
    a change in said light patterns accompanying a change in the position of said spaced subject mirrors in the direction of the beams incident thereon is indicative of said change in position.

3. An interferometer optical system as in claim 1 wherein,
    one of the spaced subject mirrors is rotatably moveable with respect to the other and
    a change in said light patterns accompanying a rotation of the position of one of said spaced subject mirrors with respect to the other is indicative of said rotation.

4. An interferometer optical system as in claim 1 wherein,
    the spaced subject mirrors are translatably moveable with respect to each other and
    a change in said light patterns accompanying a change in the position of said spaced subject mirrors is indicative of said translation.

5. An interferometer optical system as in claim 1 wherein,
    the first beam from the beam splitting means is the same direction as the initial laser beam,
    the second beam from the beam splitting means is at an angle to the initial laser beam, and
    the first and second spaced subject mirrors are oppositely facing.

6. An interferometer optical system as in claim 1 wherein, said first and second beams are so sized with respect to said two subject mirrors such that a portion of the first beam and a portion of the second beam
    pass and do not reflect from the two subject mirrors,
    such portion of the first beam is directed back to the beam
    splitting means by the second optical means, such portion of the second beam is directed back to the beam splitting means by the first optical means, and said portions are directed from the beam splitting means,
    one superimposed upon the other along a common output path to the target providing an outer light pattern on the target and
    said outer light pattern is indicative of the degree of misalignment of the first, third, and fourth mirrors relative to the beam splitting means and the initial path of the laser radiation.

7. An interferometer system as in claim 1 wherein, the common output path is parallel to the initial direction of the second beam from the beam splitting means.

8. An interferometer optical system for measuring the optical parallelism of first and second spaced subject mirrors comprising,
    a source of spacially coherent radiation directed along an initial path,
    a target for said radiation,
    means for splitting said radiation along said initial path into two beams, a first beam and a second beam,
    first optical means for directing the first beam normal to said first subject mirror,
    second optical means for directing said second beam normal to the second subject mirror,
    the first optical means includes first, second and third mutually perpendicular mirrors which intercept the first beam from the beam splitting means and combines with said beam splitting means and said first spaced mirror to define a first optical path, the second optical means includes a fourth mirror which intercepts the second beam from the beam splitting means and combines with said beam splitting means and the second subject mirror to define a second optical path, the first, second, third and fourth mirrors and the beam splitting means, without the two spaced mirrors in the system, define a closed optical path for both the first and the second beams over which these beams each return to a point of origin at the beam splitting means, whereat the returned first and second beams are superimposed one upon the other and directed along a common output path to the target and said two subject mirrors are located along said closed path between the third and fourth mirrors, whereby when said two spaced mirrors are so placed in the system, the superimposed first and second beams along the common output path directed to the target reveal an interference pattern which is indicative of the degree of non-parallelism of the two spaced mirrors.

* * * * *